United States Patent [19]

Martin et al.

[11] 4,059,823

[45] Nov. 22, 1977

[54] TIRE PRESSURE INDICATOR

[75] Inventors: Clyde J. Martin, Cincinnati; Floyd A. Nicholson, Mount Clemens, both of Mich.

[73] Assignee: Tyrspy Inc., Detroit, Mich.

[21] Appl. No.: 759,820

[22] Filed: Jan. 17, 1977

[51] Int. Cl.$^2$ ............................................. B60C 23/04
[52] U.S. Cl. ................................... 340/58; 73/146.5; 116/34 R; 200/82 E
[58] Field of Search ................ 73/146.5, 146.8, 146.3, 73/419; 340/58; 200/82 E, 81.9 M; 116/34 R

[56] References Cited

U.S. PATENT DOCUMENTS

| 3,260,233 | 7/1966 | Bergunder | 116/34 R |
| 3,588,815 | 6/1971 | Koonce | 340/58 |
| 3,961,309 | 6/1976 | Eddy | 340/58 |

*Primary Examiner*—Donald O. Woodiel
*Attorney, Agent, or Firm*—Barnes, Kisselle, Raisch & Choate

[57] ABSTRACT

A wheel-mounted tire pressure indicator which includes a housing enclosing a pneumatically-actuated pressure indicia scale as well as a self-contained battery and circuit for energizing a signal light on the housing when the tire pressure is below a predetermined selected value.

20 Claims, 8 Drawing Figures

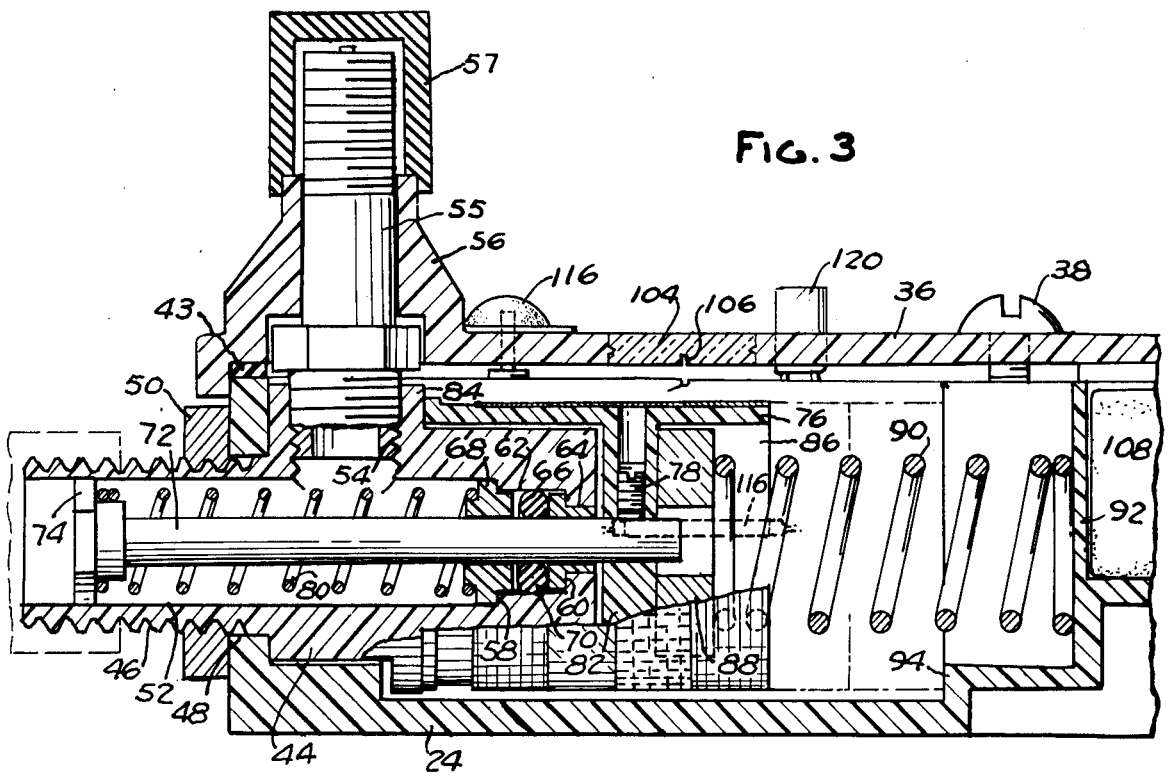
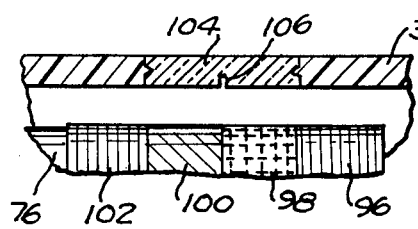
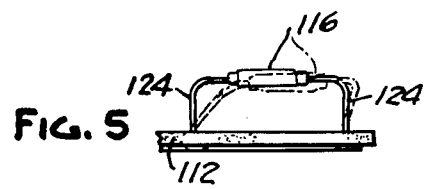
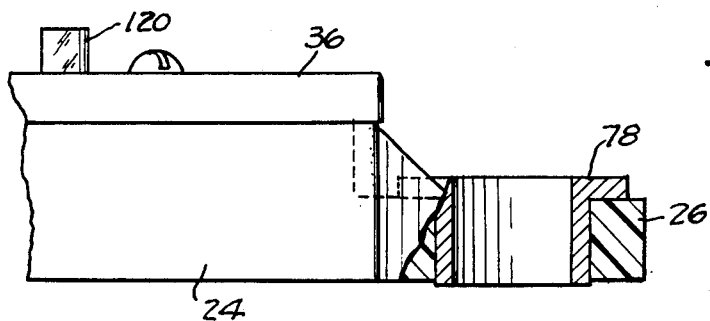
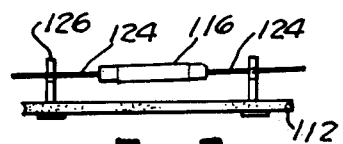
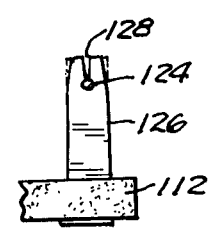

TIRE PRESSURE INDICATOR

This invention relates to a tire pressure indicator for vehicle wheels.

Various types of wheel-mounted tire pressure indicators have been proposed heretofor, but, to our knowledge, none has gained wide commercial acceptance. The lack of such acceptance results from the cost, the service problems resulting from such indicators and also the inconvenience involved in their use.

The present invention has for its primary object the provision of a tire pressure indicator which is not only of economical construction, but also reliable operation over an extended period of time and convenient to use.

More specifically, this invention contemplates a self-contained tire pressure indicator in the form of a housing adapted to be mounted on a vehicle wheel and arranged to illuminate a signal lamp on the housing when the tire pressure is below a selected predetermined value. In addition, the indicator of this invention is adapted to indicate the pressure of the tire relative to any preselected pressure by simply substituting one spring for a differently calibrated spring.

The invention likewise comprises a self-contained unit which not only signals under-inflation of the tire by energizing a light, but also indicates by a visual scale the extent to which the tire is either under- or over-inflated.

Other objects, features and advantages of the present invention will become apparent from the following description and accompanying drawings, in which:

FIG. 3 is a view taken along the line 3—3 in FIG. 2 and showing the position assumed by component parts thereof when the tire is under-inflated;

FIG. 4 is a fragmentary view of a portion of FIG. 3 showing components thereof when the tire is properly inflated.

FIG. 5 is a fragmentary sectional view along the line 5—5 in FIG. 2;

FIG. 6 is a fragmentary sectional view along the line 6—6 in FIG. 2;

FIG. 7 is a view similar to FIG. 5 showing a modified form of mounting for the electrical switch; and FIG. 8 is an end view of the mounting illustrated in FIG. 7.

Figure 1:
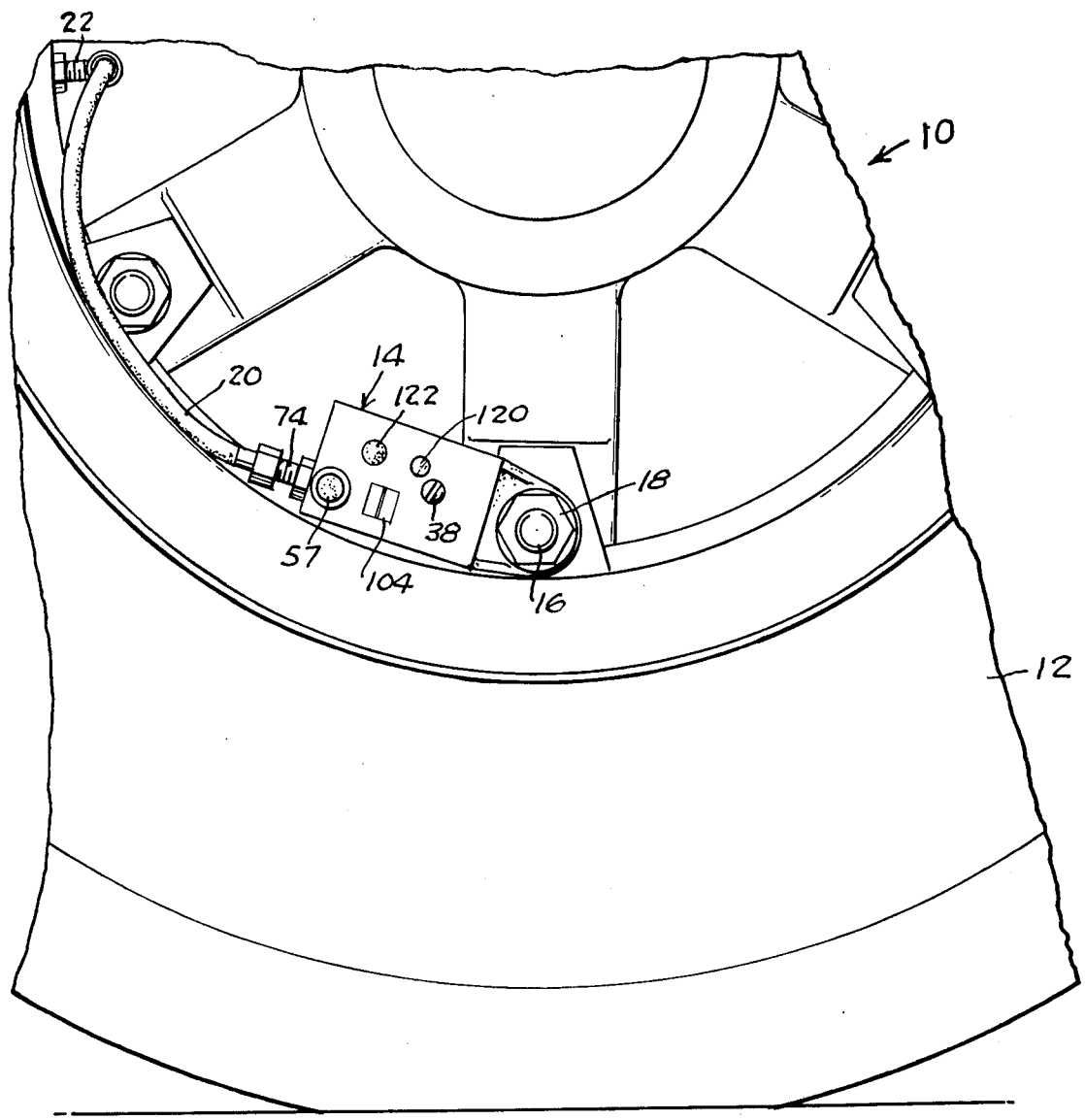
FIG. 1 is a fragmentary view of a vehicle wheel showing the tire pressure indicator of this invention mounted thereon.
Figure 2:
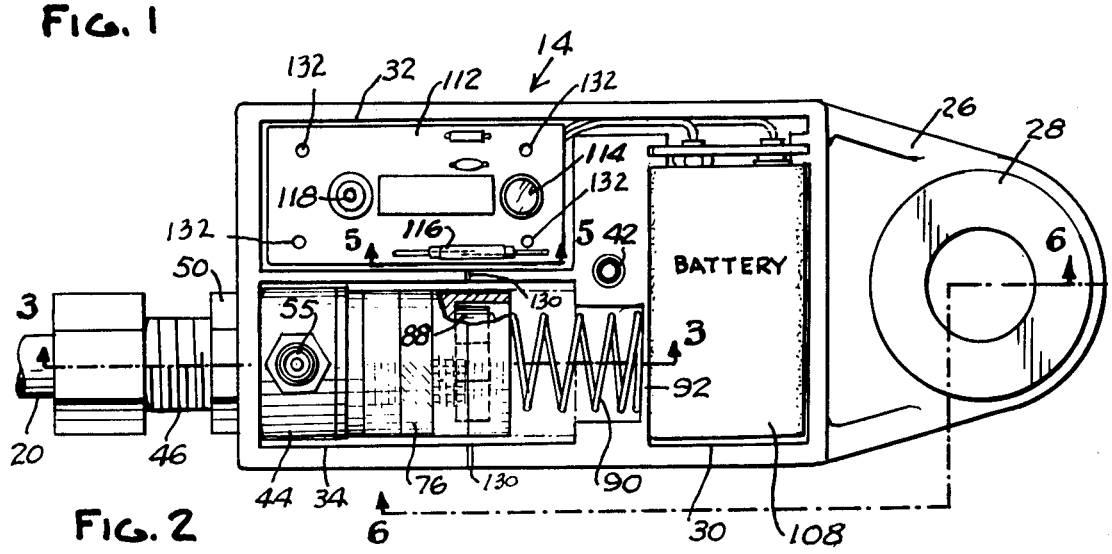
FIG. 2 is a view of the tire pressure indicator with the cover removed therefrom.

Referring to FIG. 1, there is illustrated at 10 a truck wheel having a tire 12 mounted thereon. The tire pressure indicator of the present invention, which is generally designated 14, is mounted on one of the conventional wheel lugs 16 and locked in place by a lug nut 18. A rubber or other flexible tube 20 is connected at one end to indicator 14 and at its other end to the conventional valve stem 22 on the wheel having the valve removed therefrom. Referring more particularly to FIGS. 2 and 3, indicator 14 comprises a housing 24 which is molded or otherwise formed of a non-metallic material, such as plastic. At one end thereof housing 24 is provided with an apertured extension lug 26 in which a metal bushing 28 is secured for facilitating mounting of the unit securely on a vehicle wheel in the manner illustrated in FIG. 1.

The interior of housing 24 is partitioned into a battery compartment 30, an electrical circuit board compartment 32 and a cylinder compartment 34. These compartments are closed by a cover 36 which is partially retained in place by a screw 38 threaded into a lug 40 in the housing as at 42. A gasket 43 forms a dirt and moisture seal between the cover and housing. Within compartment 34 there is arranged a cylinder body 44 which has a threaded fitting 46 formed integrally at one end thereof. Fitting 46 extends through an aperture 48 in one end wall of housing 24 and is secured in place by a nut 50. Cylinder 44 is formed of a non-magnetic material, such as aluminum, and is provided with a central bore 52 and a threaded cross bore 54 communicating with bore 52. A conventional valve stem 55 is threaded into cross bore 54. Valve stem 55 extends upwardly through a shroud 56 formed integrally with cover 36. A valve cap 57 is threaded over the upper end of valve stem 55 and, when tightened, bears down on the upper end of shroud 56 and forms a seal around the upper end thereof as shown in FIG. 3.

The end portion of bore 52 opposite fitting 46 is formed with two concentric shoulders 58,60 which define reduced bore sections 62 and 64 respectively. Within bore portion 64 there is arranged a bearing 66 having a flange which abuts against shoulder 60. Bearing 66 is formed of a non-metallic, low-friction material, such as nylon. Within bore 52 there is arranged a lubrication bushing 68 having a flange which abuts against shoulder 58. An O-ring 70 is arranged in bore portion 62 between bushing 68 and bearing 66. Bushing 68, preferably formed of an oil-impregnated, sintered, powdered metal, provides lifetime lubrication to the oil ring. Shoulder 58 prevents O-ring 70 from being squeezed by bushing 68 and thereby reduces the "break-away" friction of the O-ring.

A piston 72 is slideably arranged in bore 52. Piston 72 comprises a rod extending through bushing 68 and bearing 66. Rod 72 is formed of a non-magnetic material, such as aluminum, and has a very close fit with the bore of bearing 66. One end of rod 72 is provided with an enlarged head 74 which is preferably hex-shaped with rounded corners so as to have a smooth sliding fit with bore 52 and so that air is free to flow across head 74 through the passageways defined between the flat faces of the hex-shaped head and the cylindrical surface of bore 52. The opposite end of rod 72 projects outwardly through the end of cylinder 44 and has a retainer 76 fixedly secured thereto as by a lock screw 78. Piston 72 is urged axially toward the fitting end thereof by means of a light-weight spring 80 which at one end bears against and is centered by bushing 68 and which at its other end is centered by and bears against the underside of head 74. The sole function of spring 80 is to retain bushing 68 against shoulder 58.

Retainer 76 is formed as a plastic or aluminum cylindrical sleeve having a centrally apertured partition 82 intermediate its ends. One end of retainer 76 telescopes over the adjacent end of cylinder 44 and abuts against a radially outwardly extending flange 84 on cylinder 44. Within the cavity 86 at the other end of retainer 76 there is located a circular magnet 88. A non-magnetic compression spring 90 which is relatively heavy in comparison to spring 80 has one end bearing against magnet 88 and the opposite end bearing against partition 92 in housing 24. Spring 90 biases the piston 72 with the retainer 76 thereon in a direction toward the left as seen in FIGS. 2 and 3. Over-compression of spring 90 is prevented by a shoulder 94 in housing 24 against which the adjacent end of retainer 76 is adapted to abut when piston 72 is displaced in a direction towards the right as viewed in FIG. 3.

Retainer 76 has bonded to the outer cylindrical surface thereof a plurality of color bands 96,98,100,102. These color bands are visible from exteriorly of the housing through a transparent window 104 on cover 36 which overlies retainer 76. Window 104 has a straight indicia line 106 thereon which is aligned with one of the color bands 96 – 102, depending upon the axial displacement of retainer 76. As shown in FIG. 4, these color bands may be arranged successively so that band 96 is red; band 98 is yellow; band 100 is green; and band 102 is red. If desired, numerical values indicating tire pressures may also be spaced along retainer 76 in the color band zone. Spring 90 is calibrated so that, when the tire is inflated to a desired preselected pressure, indicia line 106 will register with green color band 100 to indicate proper inflation of the tire. Accordingly, if the tire is overinflated indicia line 106 will register with band 102. If the tire is slightly under-inflated line 106 will register with band 98; and, if the tire is excessively underinflated, line 106 will register with band 96. It will be realized, of course, that the extent to which spring 90 is compressed and retainer 76 displaced in a direction toward the right as viewed in FIG. 3 will depend upon the differential pressure across piston 72. It will also be appreciated that, if the indicator is set to designate a proper tire inflation of 40 pounds per square inch and it is desired to use it on a vehicle wheel the tire pressure of which should be 60 pounds per square inch, then it is only necessary to select a stiffer or longer spring 90 so that when the tire pressure is 60 pounds per square inch line 106 on window 104 will register with color band 100.

As shown in FIG. 2, within compartment 30 there is located a battery 108 which is connected by conductors 110 with an electronic circuit mounted on a circuit board 112 which is sized to be snugly received in compartment 32. The circuit includes, among other things, a signal light 114, a switch 116 and a push button switch 118. Switches 116, 118 are in parallel circuit with light 114 and battery 108 so that if either of these switches is closed signal light 114 will be illuminated. A transparent cap 120 on cover 36 registers with light 114 to visibly indicate when the light is illuminated. Likewise, a depressible rubber cap 122 on cover 36 registers with push button switch 118 so that the switch can be actuated from exteriorly of the housing to determine whether or not the circuit and signal light 114 are operating properly.

In the arrangement illustrated, switch 116 is a magnetically responsive reed switch which is closed by magnet 88 when the magnet is displaced by piston 72 to a position directly adjacent the switch. More specifically, switch 116 is located on circuit board 112 so that when the tire is inflated to a pressure below a predetermined selected value magnet 88 will be located as shown in FIG. 3 directly adjacent switch 116 to close the same and thereby energize light 114. As shown in FIG. 5, switch 116 has stiff wire leads 124 projecting from its opposite ends which are bent downwardly and secured to the underside of circuit board 112 in the electrical circuit. If necessary, switch 116 can be adjusted axially of retainer 76 by simply bending the leads 124 so that the switch will be properly located relative to magnet 88 when the piston is displaced to a position to indicate under-inflation of the tire.

In the alternate construction shown in FIGS. 7 and 8 switch 116 is connected into the circuit by means of a pair of upstanding slotted terminals 126 in the circuit which are secured to the underside of circuit board 112. The upper ends of terminals 126 are apertured and notched as at 128 to slideably receive the leads 124 of reed switch 116. With this arrangement switch 116 can be shifted axially of retainer 76 to the proper position and thereafter the upper ends of terminals 126 can be crimped and/or soldered to firmly secure the leads 124 thereto.

In operation the proper spring 90 is assembled in the indicator and the indicator with the cover 36 removed is placed in a fixture designed to displace piston 72 such that a pair of transversely aligned notches 130 in the upper edges of housing 24 will be aligned with the color band 100 on retainer 76. Notches 130 are located such that they will align with the color indicia line 106 on window 104 when the cover is applied to the housing. With the piston 72 displaced by the fixture in the manner described, switch 116 is shifted axially in a direction such that signal light 114 is de-energized and will again be energized when retainer 76 is shifted slightly in a direction towards the left as viewed in FIG. 3. After the indicator is so assembled and switch 116 so adjusted the circuit board is secured in place on four stand offs 132 molded in the bottom of cavity 32 and the entire cavity 32 is filled with an electrical potting material. The cover 36 is applied to housing 24 and secured thereto by screw 38 and valve cap 57. The unit is then applied to a lug of the wheel as shown in FIG. 1 in a position such that piston 72 extends generally circumferentially of the wheel. Tube 20 is then connected to valve stem 22 and fitting 74. The indicator is then operative to indicate whether or not the tire is over- or underinflated.

To initially determine whether the entire circuit is in working order, rubber cap 122 is depressed to actuate push button switch 118. This will illuminate signal light 114 if the unit is in proper working order. Thereafter, if the tire is inflated to the desired preselected pressure, signal light 114 will not be illuminated since magnet 88 will have been displaced to a position out of the range of actuating switch 116. By the same token, indicia line 106 will register with color band 100 on retainer 76. When the tire pressure diminishes below the pre-selected value, spring 90 will shift retainer 76 to the left to a position wherein magnet 88 will shift retainer 76 to the left to a position wherein magnet 88 will close switch 116 and illuminate signal light 114. Light 114 will be visible through the transparent cap 120 even when the vehicle is operating. When the vehicle operator, a truck driver for example, stops the vehicle, he can walk around it and determine which, if any, of the tires are under-inflated by simply determining whether any of the signal lights 114 are illuminated. If the signal light of a particular wheel is illuminated, he can determine the extent of under-inflation by visually observing the position of indicia line 106 relative to color bands 98,96. If indicia 106 registers with color band 98 he can assume that the tire is only slightly under-inflated and may decide to continue his trip to the next service station. On the other hand, if indicia line 106 registers with color band 96, he may determine that the tire needs further inflation or replacement at that point. Inflation can be effected by applying air to the tire through valve stem 55.

Thus, the indicator of the present invention provides a very useful instrument for vehicle operators which is convenient to use. It is constructed so as to be very reliable over an extended period of time. The axial displacement of piston 72 is substantially unaffected by the centrifugal force resulting from the rotation of the wheel since it extends circumferentially rather than radially. In addition, retainer 76 is formed as an elongated sleeve and is arranged in overlapping relation with the cylinder body 44 not only to minimize the length of the unit while permitting visual indication of a wide range of tire pressures, but also to maintain the center of mass of the movable portion of the indicator relatively close to the bearing 66.

We claim:

1. A tire pressure indicator comprising a housing having means thereon for attaching it to a vehicle wheel, a cylinder in said housing, a piston slideable axially in said cylinder, a switch actuator supported by said piston for movement therewith, means on said cylinder adapted to be connected with the valve stem of a vehicle tire for subjecting one side of the piston to the pressure of the air in the tire, a spring yieldably opposing movement of the piston in response to the air pressure exerted against said one side thereof so that the position of said switch actuator in a direction axially of said cylinder is determined by the extent to which the tire air pressure overcomes the force on the piston produced by said spring, an indicator light on said housing and means in said housing forming an electrical circuit for energizing the indicator light, said circuit means including a switch disposed in said housing in a predetermined position axially of said cylinder for actuation by said switch actuator when the tire pressure is below a predetermined value and thereby energize said signal light.

2. A tire pressure indicator as called for in claim 1 wherein said housing has a viewing aperture therein and including a visual indicator fixed to and movable with said piston, said visual indicator having indicia thereon visible through said viewing aperture for visually indicating the tire pressure relative to said predetermined value.

3. A tire pressure indicator as called for in claim 2 wherein said viewing aperture is closed by a transparent window having indicia thereon, said indicator being fixed to said piston and said switch being positioned relative to said switch actuator such that the signal light is energized only when the position of the indicia on the indicator is displaced relative to the indicia on said window to indicate that the tire pressure is below said predetermined value.

4. A tire pressure indicator as called for in claim 3 wherein the indicia on said indicator comprises a plurality of differently colored bands spaced axially along said indicator.

5. A tire pressure indicator as called for in claim 4 including a manual switch on said housing in parallel circuit with said first-mentioned switch, said manual switch being actuatable to close said circuit to said signal light to determine whether or not the circuit and signal light are in operating condition.

6. A tire pressure indicator as called for in claim 1 wherein said circuit means is mounted on a circuit board, said housing having means therein for locating said circuit board in a fixed predetermined position therein, and means for adjusting said switch on said circuit board in a direction axially of the cylinder.

7. A tire pressure indicator as called for in claim 1 wherein said switch actuator comprises a magnet and the switch closes when the magnet moves in one direction to a predetermined position in close proximity to said switch.

8. A tire pressure indicator as called for in claim 7 wherein said switch comprises a reed switch.

9. A tire pressure indicator as called for in claim 8 including means for adjusting the position of said reed switch in a direction parallel to the axis of the cylinder to vary the position at which the magnet closes said switch.

10. A tire pressure indicator as called for in claim 8 wherein said piston projects axially beyond said cylinder at one end thereof and including an annular member secured to said end of said piston, said magnet being seated in said annular member and being retained therein by said spring.

11. A tire pressure indicator as called for in claim 10 wherein said annular member has an outer surface provided with axially spaced indicia thereon for designating the tire pressure relative to said predetermined value, said housing having a viewing aperture therein registering with said indicia.

12. A tire pressure indicator as called for in claim 11 wherein said indicia is divided into a plurality of axially successive zones, one of said zones designating said predetermined pressure and being spaced intermediate the other zones, said other zones designating the extent to which the tire is over- or under-inflated.

13. A tire pressure indicator as called for in claim 1 wherein said cylinder has a large bore and a concentric smaller bore, said piston comprising a rod slideably arranged in the smaller bore with a close fit and having a head at one end slideably arranged in said larger bore.

14. A tire pressure indicator as called for in claim 13 wherein said rod is formed of a non-magnetic metal and said smaller bore is formed of a low-friction plastic material.

15. A tire pressure indicator comprising a non-magnetic housing adapted to be mounted on a vehicle wheel, a non-magnetic cylinder in said housing projecting outwardly of the housing at one end for connection with a conduit extending from the valve stem of the vehicle wheel tire so that the tire pressure is applied to the cylinder, said cylinder having a non-magnetic piston slideably arranged therein, said piston being biased axially away from said one end of the cylinder in response to the application of air pressure from the tire at said one end thereof, said piston having one end projecting axially outwardly beyond the other end of the cylinder, a non-magnetic retainer fixedly mounted on said projecting end of the cylinder, a magnet mounted on said retainer, a compression spring bearing against said retainer at one end with its opposite end bearing against a wall of said housing for biasing said piston toward said one end of the cylinder, a signal light on said housing and means in said housing forming a circuit for energizing said light, said circuit means including a magnetically responsive switch for closing the circuit to the light when the magnet is displaced axially of the cylinder to a position in close proximity to said switch.

16. A tire pressure indicator as called for in claim 15 wherein said piston comprises a metal rod extending axially of the cylinder, said cylinder having at least two stepped concentric bores through which the rod extends, one of said bores being defined by a bushing formed of a low-friction plastic material having a close sliding fit with said rod and an O-ring in the other bore sealingly engaging said rod.

17. A tire pressure indicator as called for in claim 16 wherein the end of the cylinder through which said rod extends has an outer surface spaced radially from the walls of said housing, said retainer comprising an annular sleeve having a radial partition intermediate its ends, said rod being secured to said partition, one end portion of said sleeve overlying said outer surface of the cylinder, said magnet being seated in the other end portion of said sleeve.

18. A tire pressure indicator as called for in claim 17 wherein said sleeve has a cylindrical outer surface with axially spaced indicia thereon, said indicia extending axially along both portions of said sleeve and a viewing aperture in said housing through which only a portion of said indicia is visible, the indicia visible through said aperture being indicative of the extent of inflation of the tire.

19. A tire pressure indicator as called for in claim 18 including a valve stem connected to said cylinder and in communication with one end thereof, said valve stem extending through said housing to the exterior thereof and being adapted for connection to a source of air under pressure for directing air to the valve stem on the tire through said cylinder.

20. A tire pressure indicator as called for in claim 18 including means in said housing for limiting the extent of axial displacement of the piston in the direction opposed by said compression spring.

* * * * *